United States Patent [19]

Engle

[11] Patent Number: 5,112,172
[45] Date of Patent: May 12, 1992

[54] SLIDING PULL UP STANCHION AND METHOD

[75] Inventor: Thomas H. Engle, Cape Vincent, N.Y.

[73] Assignee: Knorr Brake Holding Corporation, Westminster, Md.

[21] Appl. No.: 581,328

[22] Filed: Sep. 12, 1990

[51] Int. Cl.⁵ .............................. B60P 7/13
[52] U.S. Cl. ........................ 410/59; 410/56; 410/64; 414/333; 414/341; 414/343; 414/786
[58] Field of Search ............ 410/56, 58, 59, 62, 410/63, 64; 414/333, 341, 343, 345, 389, 402, 679, 786

[56] References Cited

U.S. PATENT DOCUMENTS

| | | |
|---|---|---|
| 2,845,878 | 8/1958 | Gutridge . |
| 2,846,172 | 8/1958 | Gutridge et al. . |
| 2,864,321 | 12/1958 | Clejan . |
| 2,903,977 | 9/1959 | Ulinski . |
| 3,035,801 | 5/1962 | Mangels .................. 410/59 |
| 3,180,282 | 4/1965 | Gutridge et al. . |
| 3,189,307 | 6/1965 | Peterson . |
| 3,202,390 | 8/1965 | Sherrie et al. . |
| 3,236,194 | 2/1966 | Vivian . |
| 3,289,987 | 12/1966 | Candlin, Jr. et al. . |
| 3,291,074 | 12/1966 | Remy et al. . |
| 3,353,505 | 11/1967 | Rollins et al. ............ 410/59 |
| 3,358,954 | 12/1967 | Smith et al. ............. 410/59 |
| 3,486,467 | 12/1969 | Coulson .................. 410/59 X |
| 4,718,800 | 1/1988 | Engle ..................... 410/61 |
| 5,026,229 | 6/1991 | Matyas et al. ............ 410/58 X |

OTHER PUBLICATIONS

"Piggy-Back"—Scientic Library Jun. 1958, U.S. Pat. Office.

Primary Examiner—Robert J. Spar
Assistant Examiner—James Keenan
Attorney, Agent, or Firm—Barnes & Thornburg

[57] ABSTRACT

A stanchion is provided with a latch system which is operable from the tractor which positions the trailers such that a gate on the tractor locks and unlocks the latch to appropriately reposition the stanchion during the position of the trailer. The tractor also includes a hook which engages the stand to raise the stand during loading of the trailer from its lowered to its raised position to engage and secure the tractor and also to reposition the unlocked stand during unloading of the trailer.

37 Claims, 8 Drawing Sheets

SLIDING PULL UP STANCHION AND METHOD

BACKGROUND AND SUMMARY OF THE INVENTION

The present invention relates generally to supports for trailers on railroad cars and more specifically to an improved stanchion to support trailers on railroad cars.

It is well known to transport trailers of trucks on railroad cars, namely, flat bed railroad cars. Some designs have used specialized structure railroad cars and adaptors for the landing gear of semi-trailer trucks as illustrated in U.S. Pat. No. 2,864,321. Others have provided stands for the king pin of the trailer which ride along a pair of slots in the surface of the railroad car, and generally include a manually actuated mechanism to hold the stand in place on the car after adjustment. Examples of these structures are shown in U.S. Pat. Nos. 2,845,878; 2,846,172 and 2,903,977.

Collapsible fifth wheel stands have also been installed at one end of a flat bed and arranged to be raised by a chain pulled by a truck tractor beneath a parked trailer to secure it to the railroad car. This is shown in U.S. Pat. No. 3,202,390. Examples of stationary, collapsible fifth wheel stands which are raised or lowered by spring, screws or hydraulic include U.S. Pat. Nos. 3,180,282; 3,189,307; 3,291,074 and 3,289,987.

A self-propelled stanchion which can be positioned along the surface of the railroad car and raised and lowered using internal or external motors is described in my U.S. Pat. No. 4,718,800. But its operation was independent or the trailer positioning.

All of the systems of the prior art have advantages and disadvantages. Those which use specialized car design are not usable to transport other types of freight. Those which have erect stand are not as storable and require the removal of unused stands at one location and a supply at the unloading location if there is further loading to be performed. Some of the collapsible stands are not adjustable along the surface of the flat bed and, thus, do not allow for optimum placement of the maximum number of trailers on a train system. The positioning and securing of the stanchions require special equipment or more than one operator or plural steps in addition to positioning connecting and disconnecting the trailer.

Thus, it is an object of the present invention to provide a stanchion which is adjustable along the surface of a railroad car.

Another object of the present invention is to provide a stanchion system which reduces the number of steps in loading, securing, unsecuring and unloading a trailer on and from a railroad car.

Still another object of the present invention is to provide a system wherein the stanchion is repositioned and operated from the tractor which positions the trailer.

These and other objects of the invention are obtained by providing a stanchion with a latch system which is operable from the tractor which positions the trailer such that the tractor locks and unlocks the latch to appropriately reposition the stanchion during the positioning of the trailer. The stanchion includes a sled to which a stand is mounted. The latch is biased to be normally engaged to the rail car to prevent movement of the sled, and in response to an external force from the tractor disengages the rail car to prevent movement of the sled. The latch includes at least one dog and an operator or piston moving the dogs to disengage a railroad car in response to an external force. The operator and dogs are biased to the engaging position. The sled includes a channel which receives a horizontal portion of a track and the dogs engage the vertical portion of the track. The track includes a plurality of apertures in which the dogs are received.

The tractor includes a gate having a locking and unlocking position. In the unlocking position, the gate engages the operator of the latch when the tractor is adjacent to the sled to apply the external force to unlock the latch. In the locking position, the gate does not apply the external force to the latch when the tractor is adjacent to the sled. The tractor also includes a hook which engages the stand for two purposes. First it is used during loading of the trailer to raise the stand of a latched or locked sled from its lowered to its raised position to engage and secure the tractor. Second, when the stand is in its lowered position and the tractor's unlocking gate is in its unlock position the hook engages the stand and prevents motion of the sled away from the adjacent tractor. With the sled and stand thus captured between the hook and the gate, any movement of the tractor in either forward or reverse direction, will be transmitted to the unlocked sled, and it will thus move with the tractor and be repositioned during the loading and unloading of the trailer by the tractor.

A method of loading and securing a trailer to the railroad car using the tractor includes positioning the trailer over a lowered stanchion on the surface of the railroad car. The trailer and stanchion are then repositioned to a desired position on the surface of the railroad car using the tractor. The tractor is disconnected from the trailer and the stanchion is raised by the tractor to connect and secure the trailer to the railroad car. Apparatus on the tractor as mentioned above is used to unlock the stanchion from the railroad car before the repositioning step and lock the stanchion after the repositioning step. Apparatus on the tractor activates a hook to hook a portion of the stanchion to the tractor before the raising step and to unhook the stanchion from the tractor after the raising step.

The method of unloading a trailer secured to a railroad car by a stanchion using a tractor includes positioning the tractor adjacent to the trailer and the stanchion. Next, the tractor disconnects the trailer from the stanchion and connects the trailer to the tractor. The tractor repositions the trailer and the stanchion to a desired position in which the stanchion is to be stowed, and finally removes the trailer from the railroad car.

The tractor disconnects the trailer from the stanchion by lowering the stanchion. The tractor unlocks the stanchion from the railroad car by applying an unlocking force before the repositioning step and relocks the stanchion to the railroad car after the repositioning step. A hook on the tractor engages the stanchion after it is unlocked and pulls it to its repositioned position and then unhooks from the stanchion before removing the trailer. The stanchion is repositioned to one end of the railroad car to be ready for the next loading operation.

Thus, the unique stanchion and its manipulation by the tractor allows the stanchion to be repositioned during loading and unloading, in order to secure the most efficient use of deck space on the train, as well as being raised and lowered. Similarly, all the operations, repositioning and controlling of the stanchion are performed from the tractor, thereby reducing the amount of time, the number of steps and the number of people involved in the loading and unloading of the trailer and the positioning and repositioning of the stanchion.

Other objects, advantages and novel features of the present invention will become apparent from the following detailed description of the invention when considered in conjunction with the accompanying drawings.

DETAILED DESCRIPTION OF THE DRAWINGS

The present system as illustrated in FIGS. 1-9 includes a tractor 10 connected to or to be connected to a trailer 12, which is to be positioned along a surface 14 of railroad cars 16. A stanchion 18 is mounted on the railroad car 16 to support the trailer 12 and secure it to the railroad car 16. The stanchion 18 includes a slide frame 20 which slides along a rail 22 in the individual cars 16 and a stand 26 pivotally mounted to the slide 20. The rails 22 include a plurality of apertures 24 to receive a latch mechanism which is released by external force applied to plunger 28. A fifth wheel connection 30 is on the stand 26, as is the standard release mechanism 32. A pair of cars 16 are shown with the stanchion 18 at one end of the car frame 16A of the right car. The details of the latch mechanism and the stanchion 18 will be described with respect to FIGS. 10 and 11.

Figure 1:
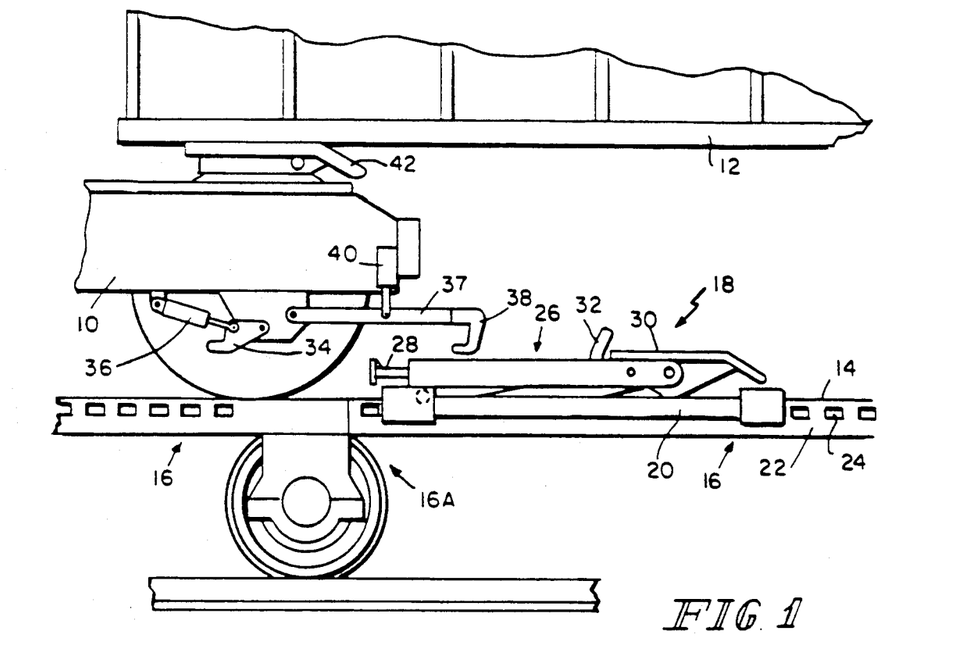
FIGS. 1-5 are schematic representations illustrating a method of loading a trailer on a railroad car according to the principles of the present invention.

The tractor 10 is shown with the closest wheel removed to expose the additional mechanism applied thereto according to the present invention. A gate 34 which applies external force to the plunger 28 of the latch mechanism of the stanchion 18 is pivotally mounted to tractor 10 and is controlled by fluid device or motor 36. In FIG. 1, the gate 34 is shown in its raised or locking position, and in FIG. 2 in its lowered or unlocking position. Also pivotally mounted to the tractor 10 is a hook 38 controlled by fluid device or motor 40 to be in its raised or unhooking position of FIG. 1, or its lower and hooking position of FIG. 2. The tractor 10 also includes a fifth wheel connection 42 to receive the king pin 44 of the trailer shown in FIG. 4.

The loading process begins, as illustrated in FIG. 1, with the stanchion 18 at one end 16A of a car 16 and the plunger 28 extended under spring biasing such that the latch mechanism is in its locked position. Trailer 12 is backed onto the car 16 by a tractor 10. The gate 34 is up in its locking position and the hook 38 is also up in its unhooking position. Trailer 12 is backed onto the decks of the cars 16 and over the dropped or lowered stanchions 18 until the platform on which the desired stanchion is located is reached.

Figure 2:
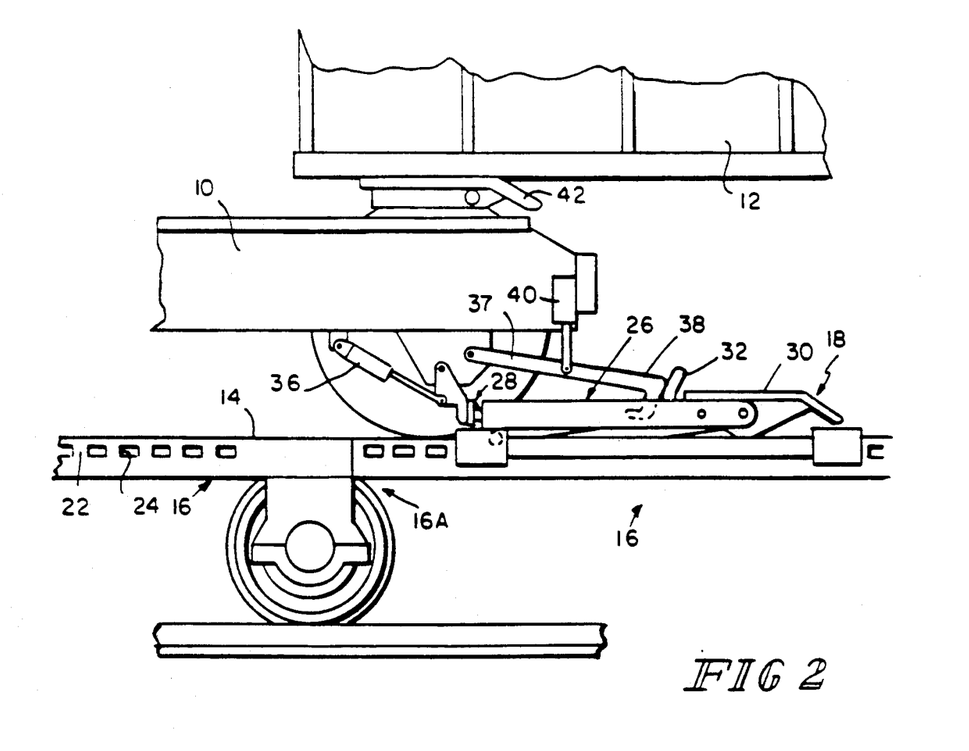

Upon approaching the desired stanchion 18, the operator lowers the gate 34 by fluid motor 36 to its down position as illustrated in FIG. 2. The tractor 10 continues to back up the trailer 12 until the gate 34 engages the plunger 28, overcoming the spring bias of the latch and unlocking the stanchion 18. The continue rearward movement of the tractor 10 moves the trailer 12 and repositions the stanchion 18 through force applied by gate 34 to the desired location along the deck 14 of the car 16. The operator also lowers the hook 38 using fluid motor 40 in preparation for later use.

Since the latching mechanism is in its lock position, the initial pressure applied by gate 34 to the plunger 28 moves the plunger relative to the sled. As the latch unlatches, the friction between the sled 20 and the surface of the car and the rails generally prevents movement of the sled relative to the railroad car and thereby maintains the latch in its unlocked position. Thus the biasing of the spring is generally less than the friction force. To further assure that the latch mechanism will unlatch or unlock the stanchion 18, the lowered hook 38 is caused to lie in an opening in the frame of the stand 26 which includes a bar. Forward movement of the hook relative to the stanchion will cause the hook 38 to engage the bar. This may be by hydraulics or by forward movement of the tractor 10. Once hook 38 engages the stanchion, the gate 34 is lowered to engage the plunger 28 and drive it back against the spring bias to unlock the latch. Thus the stanchion 18 and the plunger 28 are secured between the hook 38 and the gate 34. This not only assures unlatching or unlocking of the stanchion 18, but maintains this unlatched position for either direction of travel of the tractor 10. The distance between the hook 38 and the lowered gate 34 is selected to be substantially equal to the distance between the bar on the stand 26 and the contracted plunger 28.

Figure 3:
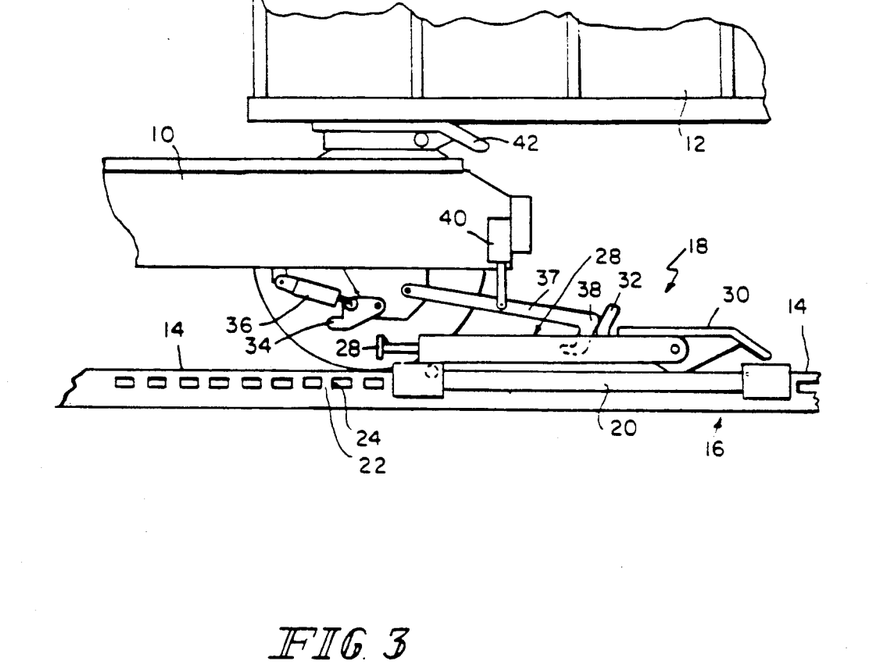

When the desired position on the surface 14 of car 16 is reached, the operator raises gate 34 from its lowered or unlocking position to its raised position or locking position. Plunger 28 is then extended and the stanchion 18 is latched or locked into place at a specific position along the surface 14 of car 16. The extended plunger 28 is illustrated in FIG. 3. The operator then sets the trailer brakes, releases the king pin from the fifth wheel connection 41, and moves the tractor forward.

Figure 4:
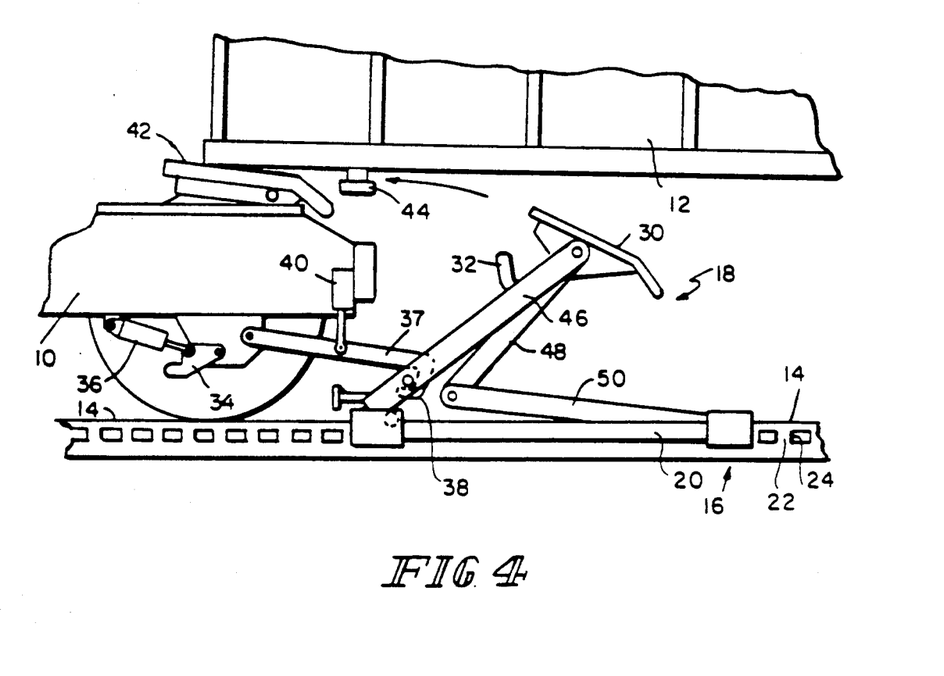

Since the hook 38 lies in an opening in the frame of the stand 26 which includes a bar, and the stanchion 18 is latched or locked to the rail 22, the forward movement of the tractor 10 causes the hook 38 to engage the bar and raises the stand 24. Simultaneously, the king pin 44 of the trailer 12 slides out of the tractor fifth wheel connection 42 as illustrated in FIG. 4. As the tractor 10 continues to move forward, the trailer 12 begins to shift from the fifth wheel connection 42 of the tractor 10 to the stanchion 18 fifth wheel connection 30. The fifth wheel connection 30 of the stanchion continues forward relative to the trailer 12 as a result of the pivoting of the stand 26. The hook adjustment is such that the release trigger 32 is not depressed at the full up position unless the tractor 10 is backed up by the operator.

Figure 5:
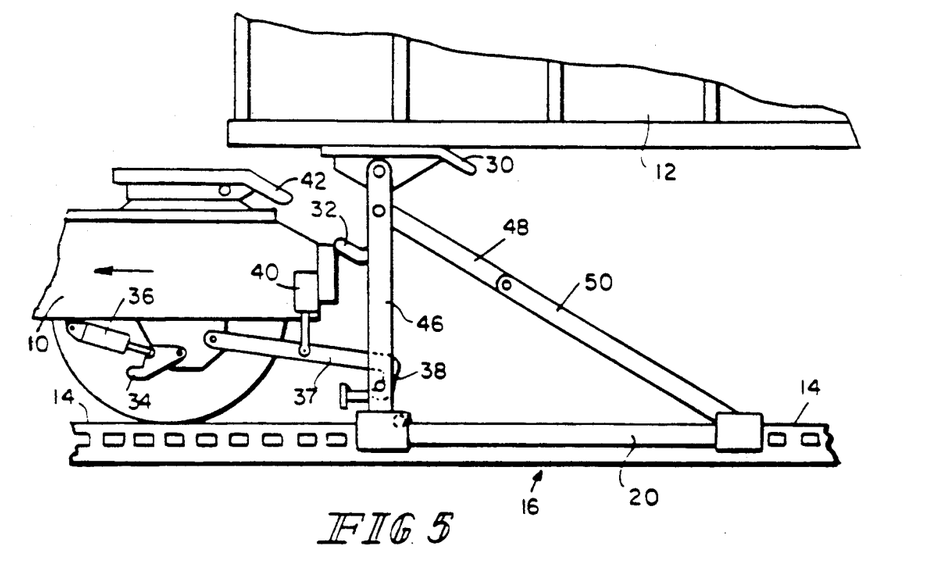

With continued forward movement of the tractor 10, as illustrated in FIG. 5, all the weight of the trailer 10 is now on the upright stanchion 26. Vertical member 46 is upright and the diagonal brace members 48 and 50 are locked to each other. The operator on the tractor 10 then raises the hook 38, disengaging it from the vertical member 46. To be certain that the king pin 42 of the trailer 12 is engaged by the fifth wheel connection 30 of the stanchion, the tractor is pulled forward and its fifth wheel connection 42 is raised. Tractor 10 is then backed against trailer 12 to push the king pin 44 home into the fifth wheel connection 30 of the stanchion 18. This completes the loading and securing of the trailer 12 to the car 16.

Figure 6:
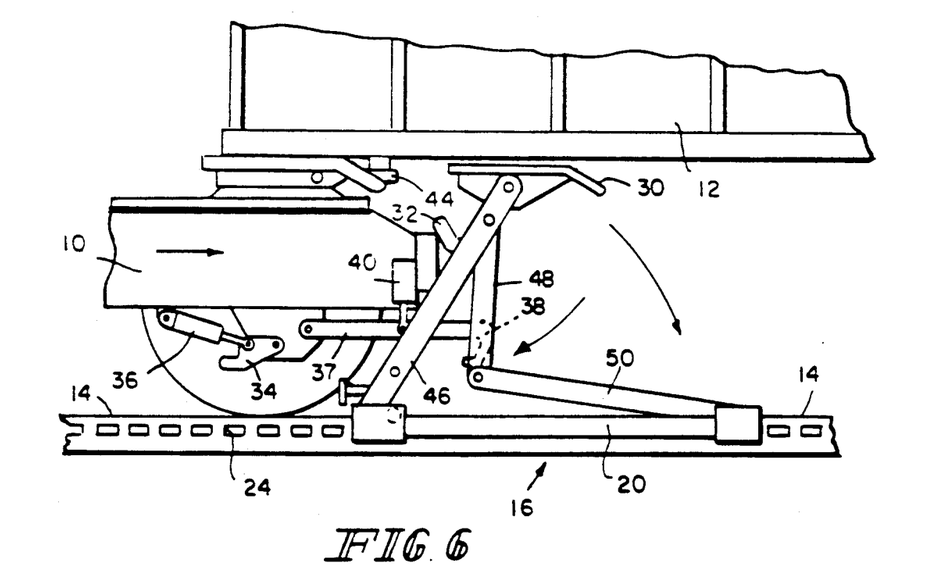
FIGS. 6-9 are schematic representations of the method of unloading a trailer from a railroad car according to the principles of the present invention.
Figure 7:
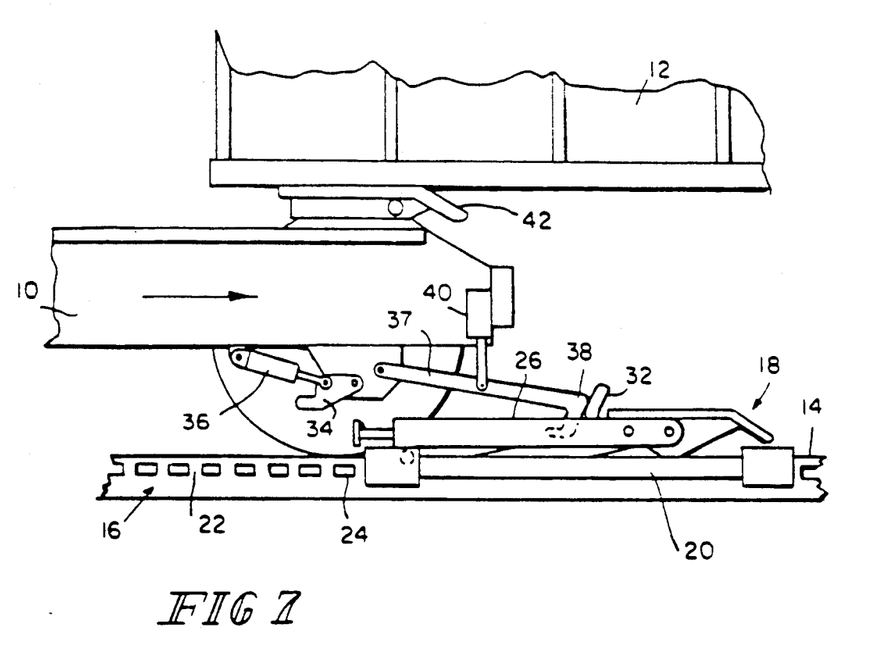

The unloading operation begins by backing up the tractor 10 until it is adjacent to the stanchion 18 and under the trailer 12. As the back of the tractor 10 engages trigger 32, it depresses it, releasing both the diagonal brace members 48 and 50 and the trailer king pin 44 and fifth wheels 30 latch With this continued movement as illustrated in FIG. 6. the stanchion 18 collapses with the weight shifting from the fifth wheel connection 30 of the stanchion 18 to the fifth wheel connection 42 of the tractor 10. The latch mechanism of the stanchion 18 is in its locked position, allowing this to occur. Similarly, the gate 34 and the hook 38 on the tractor 10 are in their raised positions. Tractor 10 continues backwards, and the trailer king pin 44 couples to the tractor fifth wheel connection 42 of the tractor 10. The driver then connects the brake hoses of the tractor 10 to the trailer 12 and releases the trailer brakes. Stanchion 18 is in its completely clasped position as illustrated in FIG. 7.

Figure 8:
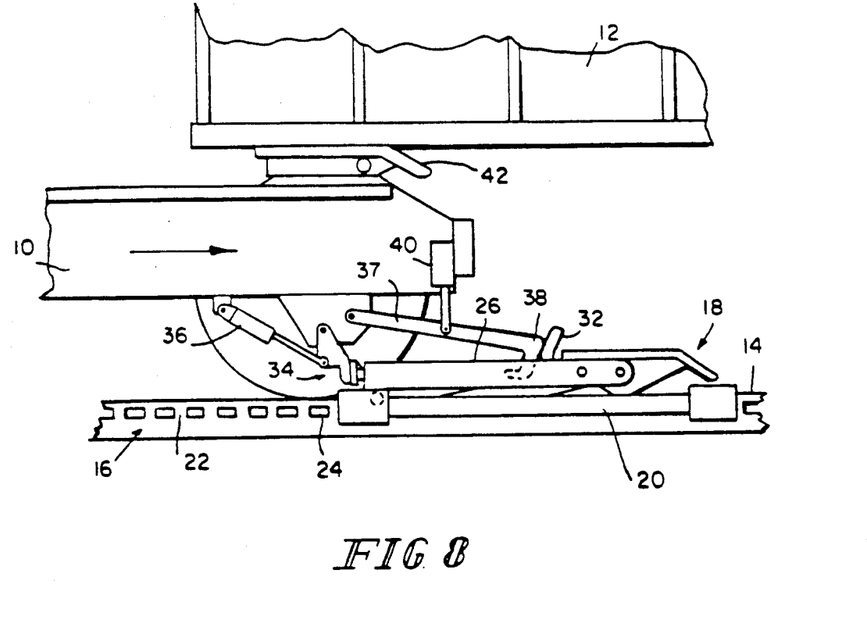
Figure 9:
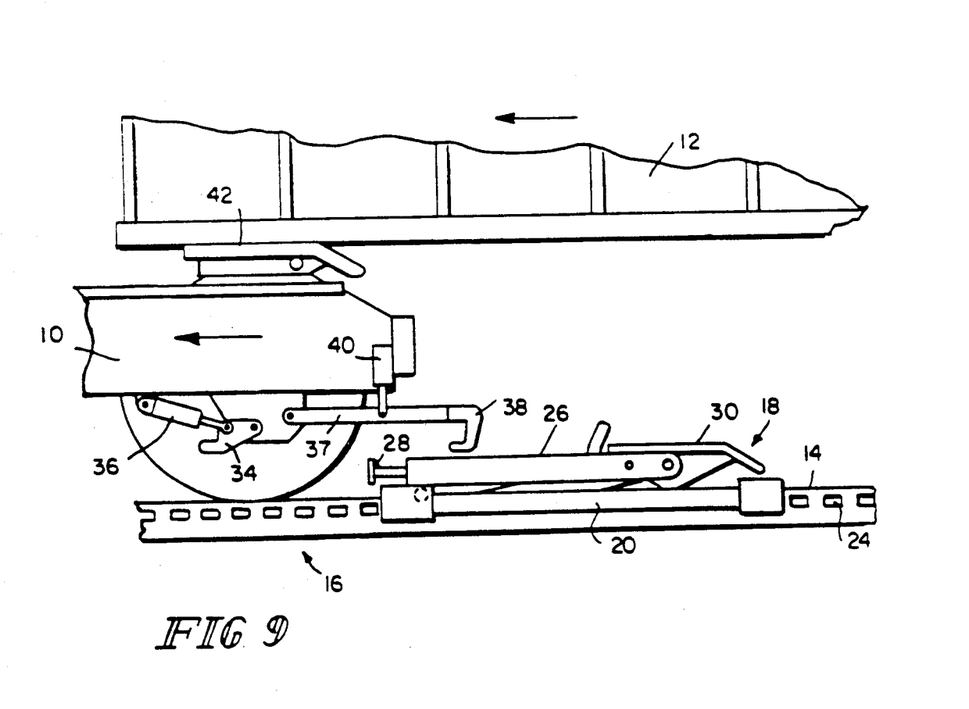

To reposition the stanchion 18 at the front end 16A of car 16. the operator activates fluid motor 40 to drop the hook 38 to its lowered position to hook the stanchion 18. This is illustrated in FIG. 7. Next, the operator activates the fluid motor 36 to lower the gate 34 to depress the plunger 28 to unlock the latch mechanism of the stanchion 18. With the plunger 8 and stanchion 18 secure between hook 38 and gate 34 the stanchion 18 moves forward or backward with the trailer 12 and the tractor 10 when it moves forward along the deck as illustrated in FIG. 8. At the end of the deck 16A, the operator raises the hook 38 using fluid motor 40 and rotates the gate 34 up using fluid motor 36. The latch mechanism being biased, will then move to its locked position locking the stanchion 18 to the railroad car 16. This allows the tractor 10 and trailer 12 to move off the railroad car, while leaving the stanchion 18 properly positioned for loading as illustrated in FIG. 9.

As can be seen from the method of the loading and unloading of FIGS. 1-9, the interaction between the tractor 10 and the stanchion 18 allows the stanchion to be positioned and repositioned with the loading and unloading of the trailer 12, as well as being raised and lowered in its appropriate position. This is all accomplished from the tractor 10 by a single operator. Also, the stanchion 18 and the trailers 12 may be positioned anywhere along the surface of the car 16. This allows closer positioning of the trailers relative to each other, thereby reducing wind resistance and making more efficient loading.

Figure 10:
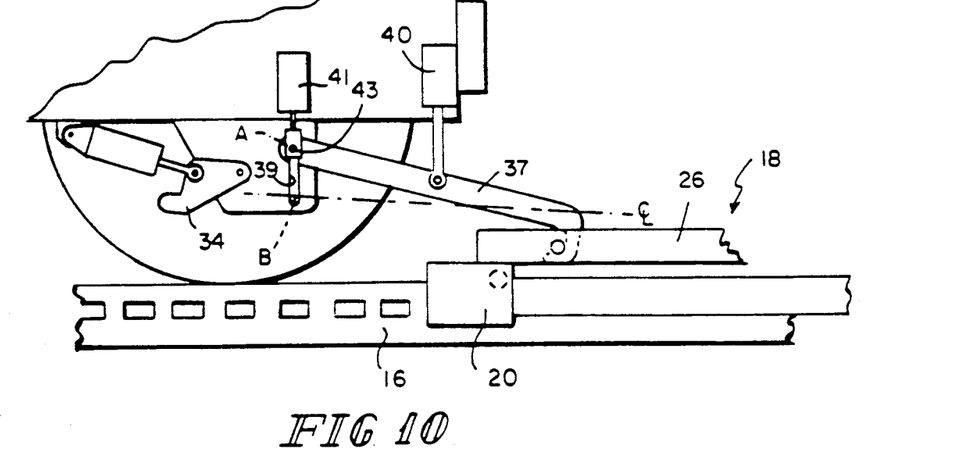
FIG. 10 is a partial view of a modification for the hook positioning mechanism.

To prevent any forward movement of the stanchion 18 from being translated into a lifting or rising motion of the stand 26, a mechanism is provided in FIG. 10 to change the center line of the hook 38. In addition to fluid motor 40, a second fluid motor 41 is provided and connected to the pivot point A of the arm of the hook 38. The arm 37 has hook 38 thereon. The fluid motor 41 shifts the pivot point 43 from position A down to position B in slot 39 to thereby lower the angle that the arm of the hook 38 makes with the direction of motion. This would substantially reduce the lifting force on the stand 26 during a sliding motion of the sled 20.

Figure 11:
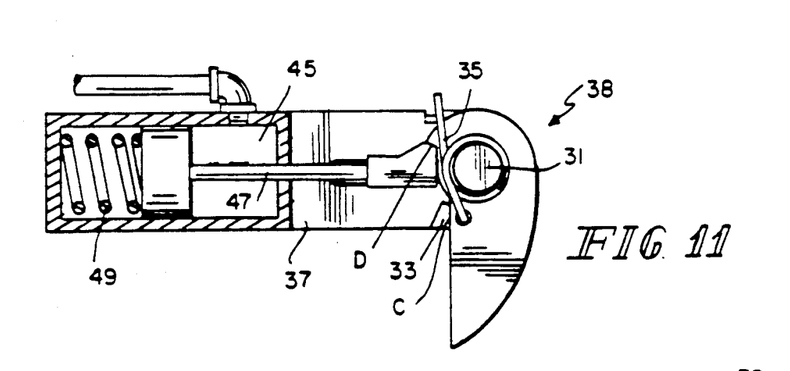
FIG. 11 is a partial cut-away side view of a hook according to the principles of the present invention in its set position.
Figure 12:
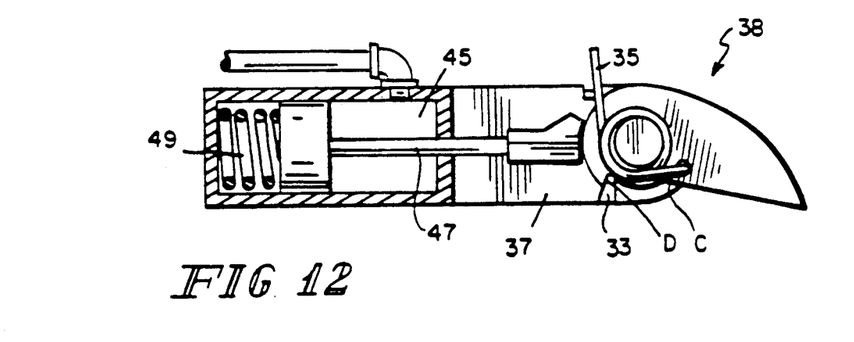
FIG. 12 is a partial cut-away side view in its released position.

To more accurately control the operation of the hook 38, a modification is illustrated in FIGS. 11 and 12. Hook 38 is pivotally connected at 31 to the hook arm 37. A stop 33 is provided on the hook arm 37 and engages surface C of the hook 38 in its hooking position as illustrated in FIG. 11 or engages surface D in its unhooked or release position as in FIG. 12. A torsion spring 35 biases the hook 38 to its set or hooking position as illustrated in FIG. 11 with a surface C engaging the stop 33. A fluid motor 47 forms part of or is connected to the hook arm 37 and includes a plunger 47 having one end extending out towards the hook 38. Spring 49 within the fluid motor 45 biases the plunger 47 to its extended position Upon fluid actuation, the piston 47 retracts against the spring 49 and retracts the piston 47. In its extended position as illustrated in FIG. 11, the piston 47 engages an axis of stop for surface D of the hook 38 and locks it in its hooked or set position When it is desired to release the hook, fluid pressure retracts the plunger 47 causing it to disengage surface D of the hook 38. Forces applied to the hook 38 to the right in FIGS. 11 and 12 will cause the hook to rotate against the spring 37 and move to a release or unhooking position. These forces are generally a forward movement of the hook relative to the stanchion 18. Once this pressure is released, the spring 35 returns the hook to the hooking position illustrated in FIG. 11. Once the fluid pressure in the motor 45 is released, the spring 49 forces the piston 47 to extend and engage the hook 38. Once the force on the hook 38 is removed, spring 35 pivots hook 38 to the position at FIG. 11 as spring 49 drives the piston 47 into its engaging lock position against surface D of the hook 38. If it is desired to have the hook 38 continue to rotate clockwise from its lock position in FIG. 11 to aid in placement, the stop 33 would be removed This may be desirable when the hook arm 37 has dropped and the hook is sliding across the stanchion 18.

Figure 13:
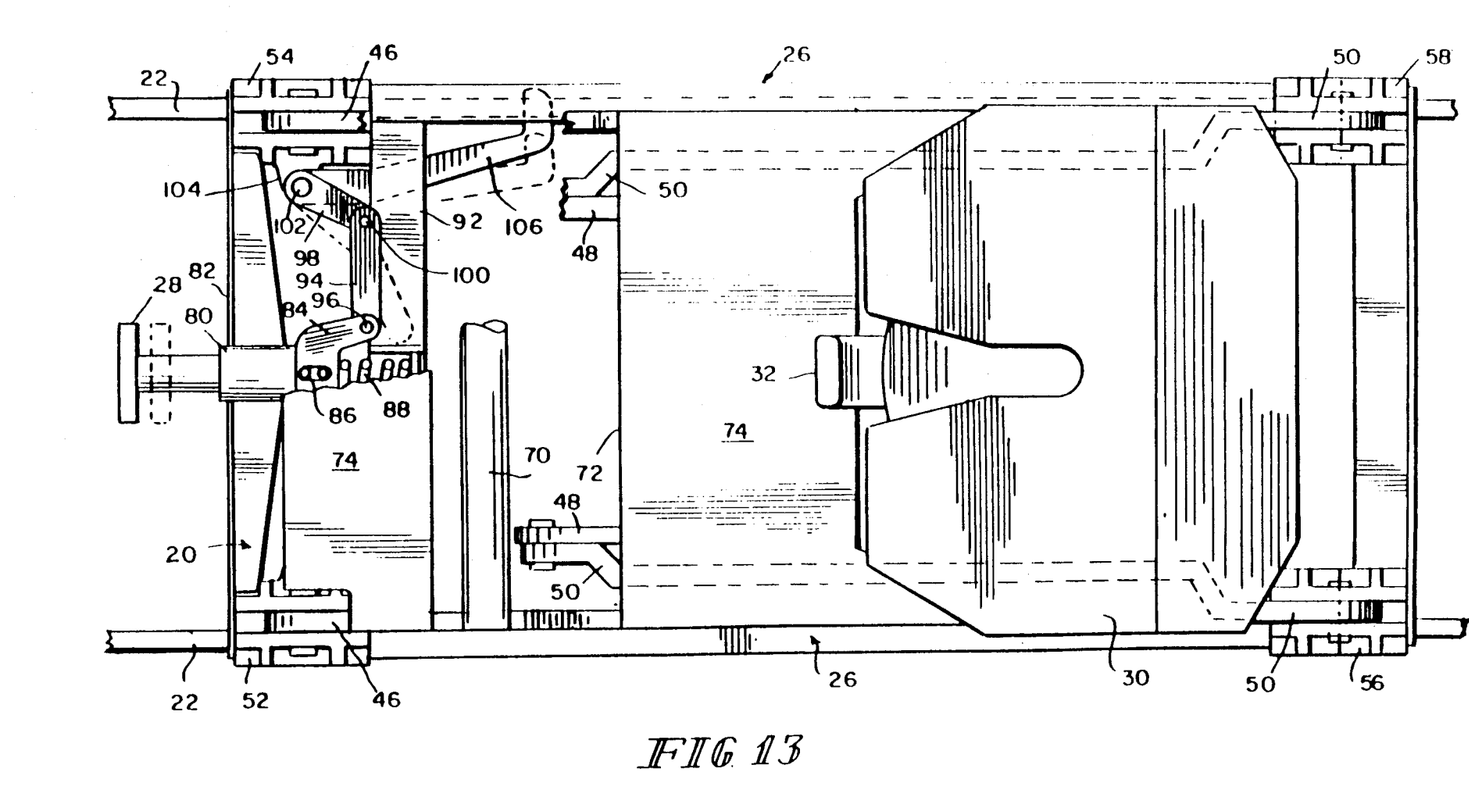
FIG. 13 is a plan view with partial cut-aways of a stanchion according to the present invention.
Figure 14:
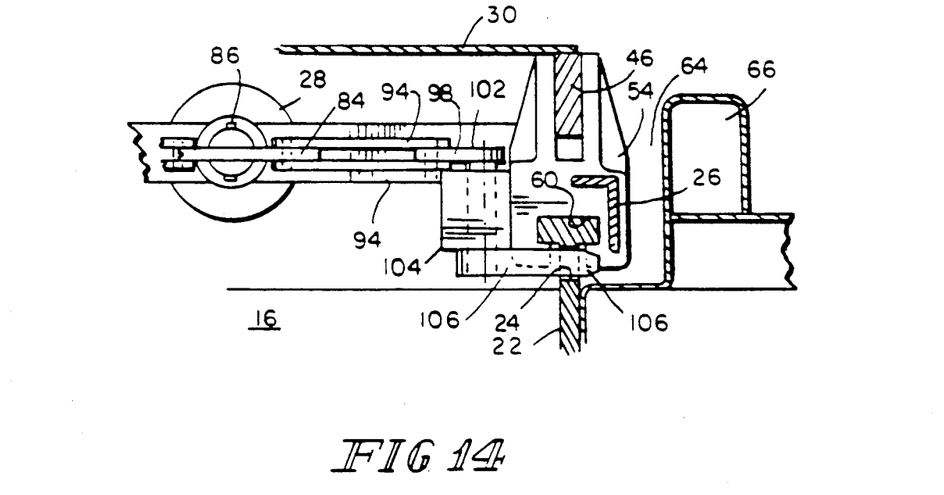
FIG. 14 is a partial cut-away front view of the stanchion of FIG. 10.

The stanchion 18 according to the present invention is illustrated in FIGS. 13 and 14. Since the stand 26, the fifth wheel connection 30 and the release mechanism 32 are well known prior art structures, they will not be described and illustrated in detail. The improvement of the present invention is the specific latching mechanism to lock the frame or sled 20 of the stanchion 18 to the railroad car 16. This is used in combination with the rail 20 having apertures 24 and the operable elements 34 and 38 on the tractor 10.

The sled 20 includes a rectangular frame having guides 52, 54, 56 and 58 at its four corners Pivotally connected to the guides 52 and 54 is the vertical stand member 46. Pivotally connected to the guides 56 and 58 is one of the diagonal struts 50 As illustrated in FIG. 14, each of the guides 52, 54, 56 and 58 includes a channel 60 for receiving the horizontal portion of the rail 22. A vertical portion of the rail 22 extends down and out of the channel 60 and is secured to the frame 62 of the car 16. The rail 22 and channel 60 position the stanchion 18 in a recess 64 in surface 14 of car 16. The wheels of the trailer 12 and the tractor 10 lie on either side of the protective wall 66 of the recess 64.

A bar 70 lies in an opening 72 of plate 74 which is secured to the vertical members 46 of the stand 26. The hook 38 engages the bar 70 in raising the stanchion during loading, and in repositioning the stanchion during unloading operations as previously described.

The latch mechanism includes the release plunger 28 which extends through a collar 80 which is secured to a face plate 82 of the sled frame. A yoke 84 is secured to the other end of the plunger 28 by fasteners 86. A spring 88 engages, at one end, the yoke 84 and, at its other end, a spring stop 90 which is secured to plate 92 of the frame. The spring 88 biases the plunger 28 to its extended or locked position. A pair of links 94 pivotally connected at 96 to the yoke 84 at one end and to an upper arm 98 of a dog at 100 at its other end. The upper arm 98 of the dog is connected by shaft 102 to the lower end of the dog 106 through a journal 104 in the guide 54. The end of dog 106 engages the apertures 24 in the rail 22 to lock the stanchion to the rail in its solid position. When the plunger 28 is retracted by the application of an external force, the yoke 84 moves the link 94 and the upper arm 98 and dog 106 to its retracted or unlocked position as illustrated in phantom in FIG. 13.

It should be noted that the relationship of links 94, yoke 84 and upper arm 98 are designed such that any forces on the dog 106 are applied along the axis of the links 94 which extends between the pivot points 96, 100. These forces along this axis thereby do not transmit forces to the plunger 28, and therefore will prevent unlocking of the dog 106 by forces applied to the dog. These forces may result from the attempted shifting of the trailer on the railroad car or any of the forces applied to the sled 20.

Although only one dog 106 is shown in FIG. 13, a second dog is under plate 74. As illustrated in FIG. 14, the second dog 106 engages an aperture 24 in the rail 22 in the vertical portion of the rail 22 below the horizontal portion.

The unique latch mechanism and its cooperation with the gate and hook on the tractor provides the versatility of the present system. Thus, a complete operation and methods of loading and unloading can be conducted by a single operator of the tractor. Other than dismounting from the tractor to connect and disconnect the brake systems of the tractor 10 and the trailer 12, the operator can load and unload the trailer 12 as well as position, reposition, raise and lower the stanchion 18 all from the cabin of the tractor 10.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A stanchion to support trailers on a railroad car, comprising:
    sled means for moving along a surface of a railroad car;
    stand means, mounted to said sled means and having lowered and raised positions, for receiving and securing a portion of a trailer;
    latch means on said sled means for normally engaging said railroad car to prevent movement of said sled means along; and
    biasing means for biasing said latch means to its locked position,
   whereby said latch means is disengaged from its locked position during the application of an external force sufficient to overcome said biasing means.

2. A stanchion according to claim 1, wherein said latch means includes at least one dog for engaging sand railroad car in said locked position of said latch means and operator means for moving said dog to disengage said railroad car in response to external force applied to said operator means.

3. A stanchion according to claim 2, wherein said operator means includes a plunger for receiving said external force and linkage connecting said plunger to said dog.

4. A stanchion according to claim 3, wherein said linkage in said locked position prevents forces on said dog from moving said latch means to said unlocked position.

5. A stanchion according to claim 3, wherein said dog is pivotally connected to said sled means; said plunger is slidably connected to said sled means; and said linkage is pivotally connected to said dog and said plunger.

6. A stanchion according to claim 5, wherein said dog in said locked position applies forces along an axis of said linkage which is through the pivotal connection of the linkage.

7. A stanchion according to claim 2, wherein said latch means includes at least two dogs for engaging said railroad car in said locked position and said operator means moves both of said dogs.

8. A stanchion to support trailers on a railroad car, comprising:
    sled means having a channel for receiving and moving along a rail on a surface of a railroad car;
    stand means, mounted to said sled means and having lowered and raised positions, for receiving and securing a portion of a trailer; and
    latch means on said sled means having at least one dog for normally engaging said rail to prevent movement of said sled means along said surface in a locked position and, in response to an external force, disengaging said rail to permit movement of said sled along said surface in an unlocked position.

9. A stanchion according to claim 8, wherein said channel receives a horizontal portion of said rail and said dog engages a vertical portion of said rail which extends from said horizontal portion of said rail.

10. A system for positioning and supporting trailers on a railroad car with a tractor, comprising:
    sled means for moving along a surface of a railroad car;
    stand means, mounted to said sled means and having lowered and raised positions, for receiving and securing a portion of a trailer;
    latch means on said sled means for normally engaging said railroad car to prevent movement of said sled means along said surface in a locked position and, in response to an external force, disengaging said railroad car to permit movement of said sled means along said surface in an unlocked position; and
    actuator means on a tractor for applying said external force to said latch means when said tractor is adjacent said sled means.

11. A system according to claim 10, wherein said latch means includes at least one dog for engaging said railroad car in said locked position of said latch means and dog operator means for moving said dog to disengage said railroad car in response to external force applied to said operator means.

12. A system according to claim 11, wherein said dog operator means includes a plunger for receiving said external force and linkage connecting said plunger to said dog; and said linkage in said locked position prevents forces on said dog from moving said latch means to said unlocked position.

13. A system according to claim 12, wherein said dog is pivotally connected to said sled means; said plunger is slidably connected to said sled means; and said linkage is pivotally connected to said dog and said plunger.

14. A system according to claim 13, wherein said dog in said locked position applies forces along an axis of said linkage which is through the pivotal connection of the linkage.

15. A system according to claim 11, wherein said latch means includes at least two dogs for engaging said railroad car in said locked position and said dog operator means moves both of said dogs.

16. A system according to claim 10, including biasing means for biasing said latch means to its locked position.

17. A system according to claim 10, including a rail at the surface of said railroad car; said sled means includes a channel means for receiving a rail; and said latch means includes at least one dog which engages said rail in said locked position of said latch means.

18. A system according to claim 17, wherein said channel means receives a horizontal portion of said rail and said dog engages a vertical portion of said rail which extends from said horizontal portion of said rail.

19. A system according to claim 18, wherein said rail includes a plurality of apertures for receiving said dog.

20. A system according to claim 10 wherein said actuator means has a locking position for applying said external force to said latch means when said tractor is adjacent said sled means and an unlocking position for not applying said external force to said latch means when said tractor is adjacent said sled means.

21. A system according to claim 20, wherein said actuator means includes a gate and an gate operator means for moving said gate between said locking and unlocking positions.

22. A system according to claim 21, wherein said gate operator means includes a fluid motor.

23. A system according to claim 10, including hook means on said tractor for engaging said stand means when said tractor is adjacent said sled means, and hook operator means for moving said hook means between engage and disengage positions.

24. A method of loading and securing a trailer to a railroad car using a tractor, comprising:
positioning a trailer over a lowered stanchion locked on a surface of a railroad car using a tractor;
unlocking said stanchion from said railroad car;
repositioning said trailer and said stanchion to a desired position on said surface using said tractor;
locking said stanchion to said railroad car;
disconnecting said tractor from said trailer; and
raising said stanchion to connect and secure said trailer to said railroad car using said tractor.

25. A method according to claim 24, wherein said unlocking said stanchion from said railroad car before said repositioning step and said locking said stanchion to said railroad car after said repositioning step are performed from said tractor.

26. A method according to claim 25, wherein said stanchion includes dogs biased into engagement with said railroad car to lock said stanchion thereto, and said tractor unlocks said stanchion by overcoming the bias on said dogs.

27. A method according to claim 24, including, from said tractor, hooking a portion of said stanchion to said tractor before said raising step and unhooking portion of said stanchion from said tractor after said raising step.

28. A method of unloading a trailer secured to a railroad car using a tractor, comprising:
positioning a tractor adjacent a trailer and a stanchion to which the trailer is connected;
disconnecting said trailer from said stanchion using said tractor;
connecting said trailer to said tractor;
unlocking said stanchion from said railroad car;
repositioning said trailer and said stanchion to a desired position on a surface of a railroad car using said tractor;
locking said stanchion to said railroad car; and
removing said trailer from said railroad car using said tractor.

29. A method according to claim 28, wherein said disconnecting step includes lowering said stanchion using said tractor.

30. A method according to claim 28, wherein said unlocking said stanchion from said railroad car before said repositioning step and said locking said stanchion to said railroad car after said repositioning step are performed from said tractor.

31. A method according to claim 30, wherein said stanchion includes dogs biased into engagement with said railroad car to lock said stanchion thereto, and said tractor unlocks said stanchion by overcoming the bias on said dogs.

32. A method according to claim 28, including, from said tractor, hooking a portion of said stanchion to said tractor before said repositioning step and unhooking portion of said stanchion from said tractor after said repositioning step.

33. A method according to claim 28, wherein said stanchion is repositioned to one end of said railroad car.

34. A method of loading and unloading a trailer on/from a railroad car,
wherein said loading comprises:
positioning a trailer over a lowered stanchion on a surface of a railroad car using a tractor,
repositioning said trailer and said stanchion to a desired position on said surface using said tractor,
disconnecting said tractor from said trailer, and
raising said stanchion to connect and secure said trailer to said railroad car using said tractor; and
wherein said unloading comprises:
positioning a tractor adjacent said trailer and said stanchion to which the trailer is connected,
disconnecting said tractor from said stanchion using said trailer,
connecting said trailer to said tractor,
repositioning said trailer and said stanchion to a desired position on said surface using said tractor,
removing said trailer from said railroad car using said tractor, and
unlocking said stanchion from said railroad car before said repositioning steps, and locking said stanchion to said railroad car after said repositioning steps.

35. A method according to claim 34, wherein said unlocking said stanchion from said railroad car before said repositioning steps and said locking said stanchion to said railroad car after said repositioning steps are performed from said tractor.

36. A method according to claim 34, including, from said tractor, hooking a portion of said stanchion to said tractor before said raising step and unhooking portion of said stanchion from said tractor after said raising step.

37. A method according to claim 34, including, from said tractor, hooking a portion of said stanchion to said tractor before said second mentioned repositioning step and unhooking portion of said stanchion from said tractor after said second mentioned repositioning step.

* * * * *